Patented Apr. 17, 1923.

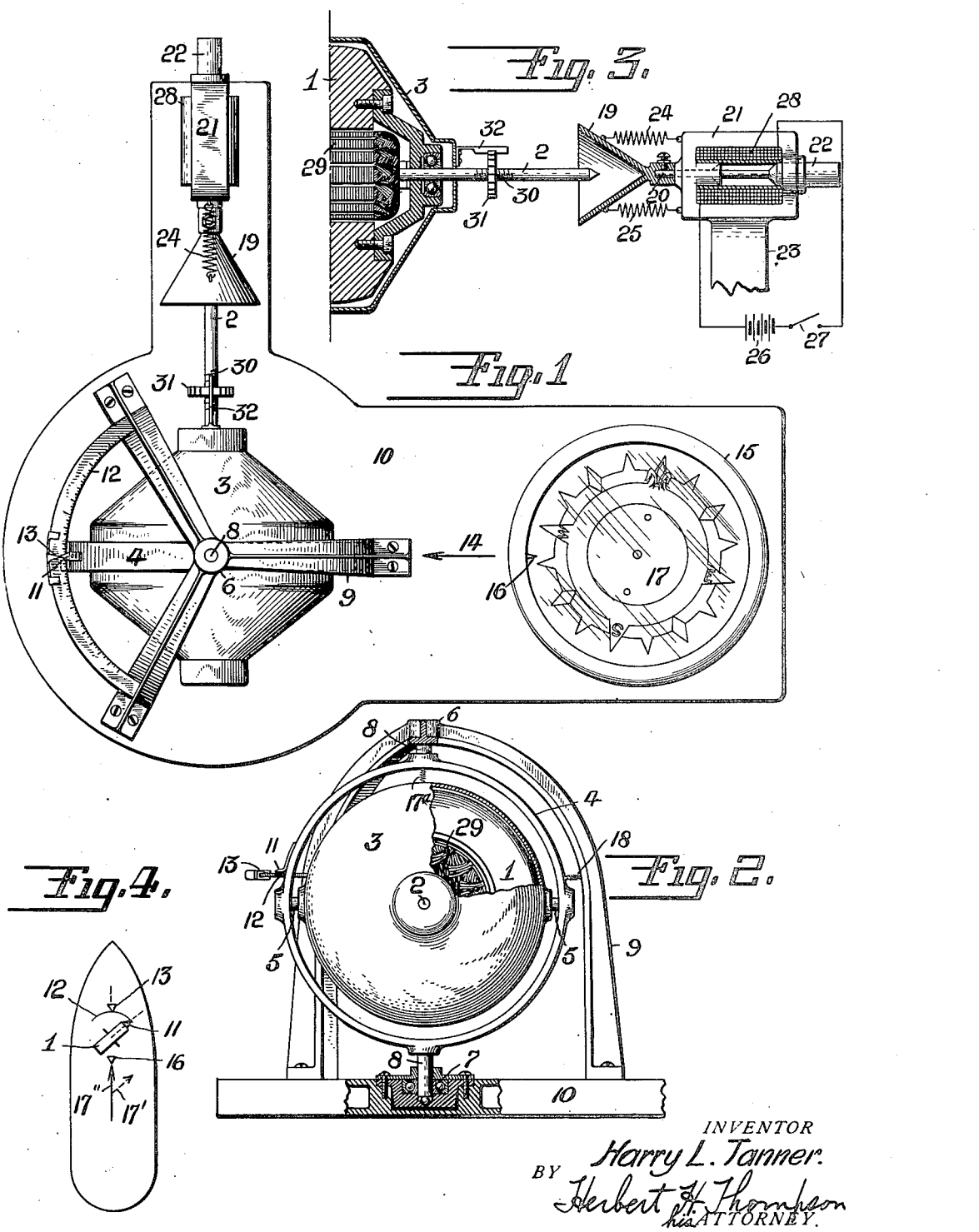

1,451,928

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

MAGNETIC GYROSCOPIC NAVIGATION DEVICE.

Application filed August 21, 1918. Serial No. 250,838.

*To all whom it may concern:*

Be it known that I, HARRY L. TANNER, a citizen of the United States of America, residing at 1144 East 19th Street, Brooklyn, in the county of Kings and State of New York, have invented certain new and useful Improvements in Magnetic Gyroscopic Navigation Devices, of which the following is a specification.

This invention relates to navigation apparatus adapted to be used on a ship or aircraft for indicating the course of the latter.

Compasses, as at present employed, are of two general types, i. e., magnetic and gyroscopic. Magnetic compasses are open to objection in that the iron on the ship causes a deviation, and to the further objection that on yaw of the ship the needle or rose follows the ship due to friction. Gyroscopic compasses are free from either of these objections, but are limited in use due to their comparatively high cost and due to the fact that considerable skill is necessary to operate them. The first stated objection to the magnetic compass may be obviated by compensating in any of the well known ways, but in so far as I am aware the second objection has never been met.

The principal object of the present invention is to provide an instrument which obviates the second objection stated above in connection with the magnetic compass, which instrument is exceedingly more simple than gyroscopic compasses. Further objects and advantages will appear as the invention is hereinafter developed.

Referring to the drawings which illustrate what I now consider the preferred form of my invention:

Fig. 1 is a plan view of a complete instrument.

Fig. 2 is a front elevation of the azimuth gyroscope forming a part of the instrument.

Fig. 3 is a fragmentary side elevation, partly in section illustrating a portion of the mechanism illustrated in Fig. 1.

Fig. 4 is a diagram employed in explaining the theory of operation of my invention.

Referring to Figs. 1, 2 and 3, it will be seen that my invention comprises an azimuth gyroscope. The rotor 1 of the latter is shown journaled for rotation about a normally horizontal shaft 2 fixedly secured to a casing 3. The latter is journaled in a ring 4 for rotation about a normally horizontal axis 5, 5 at right angles to the shaft 2. The ring 4 is shown journaled at 6, 7 for rotation about a normally vertical axis 8, 8. The journals 6, 7 are carried respectively by a three legged frame 9 and the base 10 to which said frame is secured. Any suitable means may be employed for driving the rotor 1. Thus the primary of a polyphase induction motor may be secured to the shaft 2 within the said rotor 1 which is made hollow, and which rotor constitutes the secondary of the induction motor.

The casing or frame 3 together with the structure it supports is made nonpendulous or only slightly pendulous so that on rotation of rotor 1, the latter will maintain its plane of rotation fixed in azimuth regardless of turning of the ship on which it is mounted. It is therefore clear that if an indicator is secured to either the ring 4 or the ship and a scale to the other of the two last mentioned objects, the deviation of the ship from a predetermined course will be indicated. One form of such indicating means is illustrated in Figs. 1 and 2 and may be described briefly as follows.

A pointer 11 is secured to the ring 4 in a position to travel over an arcuate scale 12 secured to two of the legs of the frame 9. This scale may be calibrated in degrees or fractions thereof and is preferably a double reading one, the zero point being preferably located opposite the position of the pointer 11 shown in Fig. 1. Assuming that the base 10 is so secured to a ship that the arrow 14 represents the fore and aft line of the latter, or a line parallel thereto, it will be seen that any deviation of the ship from a straight course, whether due to yaw or other causes will be indicated at 11, 12.

I have shown a magnetic compass 15 mounted on the base 10 and having a lubber's line 16 and rose 17. The line 16 is placed in line with the arrow 14 representing the fore and aft line of the ship. The general heading of the ship may be obtained from the reading of the compass 15, but on yaw of the ship the rose 17 follows the lubber line 16 so that the compass gives an inaccurate reading and furnishes no indication of the yaw. The gyro, however, will indicate the yaw and may therefore be employed to correct the reading of the compass as well as to aid the helmsman in reducing the yaw.

The utility and operation of my invention may best be understood by referring to Figs. 1 and 4. Assume that the ship has been headed in a predetermined direction, as indicated by the arrow 17', and it is desired to keep it on this course. The gyro 1 is spun and preferably so placed that its plane of rotation is fore and aft. The pointer 11 will then point in the direction 17' and will be held in this direction by the gyro in spite of turning of the ship. Suppose now that the ship begins to yaw and turns to port through an angle indicated between arrows 17', 17''. The rose 17 will swing with the ship through almost as great an angle and therefore will afford no indication that yaw is taking place. Furthermore, the compass reading is now incorrect by an angular amount substantially equal to the angle above mentioned. The pointer 11 will, however, continue pointing in the predetermined direction so that it will not longer read zero on scale 12 but will indicate the angular extent of deviation of the ship from the true course. It should be noted that this same reading on scale 12 is the deviation of the compass due to yaw.

Under ordinary conditions it is often desired to abandon the predetermined course of a ship and to adopt a new course. Various expedients may be adopted for adapting the gyro indicator for use on a new course, among which are the following. The zero point of the scale 12 may be shifted an angular amount numerically equal to the angle between the old and new courses but in a direction opposite to that through which the ship is turned to put it on its new course. A pointer 13 slidably mounted on scale 12 may be employed to indicate the position of the zero point, i. e., the point on which the pointer 11 should lie when the ship is on its true course.

Another, and preferred method is to move the gyro 1 so that the plane of rotation thereof is fore and aft of the ship when the latter is put on its new course, i. e., to centralize the gyro. This may be accomplished by light centralizing springs 17ª, 18 secured respectively to the casing 3 and ring 4 and to the ring 4 and frame 9 as indicated in Fig. 2. These springs will have practically no tendency to deflect the gyro on yaw but on change in course of the ship they will eventually bring the rotor 1 to a position in which its plane of rotation is fore and aft of the ship.

Instead of employing the springs 17ª, 18, or in addition thereto, the centralizing means shown in Figs. 1 and 3 may be employed. The shaft 2 is prolonged and tapered at its outer end. A conical member 19 is mounted for sliding movement at right angles to the fore and aft line 14 and is adapted to engage the end of shaft 2 of the rotor 1 to centralize the latter. Said member 19 is shown secured to a rod 20, in turn secured to an armature 22 and slidably mounted in the yoke 21 of an electromagnet 28. The yoke 21 may be supported on base 10 by means of a bracket 23. Springs 24, 25 may be secured to the member 19 and yoke 21 for the purpose of moving said member away from shaft 2. The coil 28 may be connected in series with a battery or other source of E. M. F. 26 and a switch 27.

When the ship is placed on a new course the switch 27 may be closed thus moving the cone 19 into engagement with the shaft 2 to centralize the gyro. The switch 27 is then opened and the device is set for the new course. If desirable, means may be provided for adjusting the balance of the gyroscope about the horizontal axis 5—5 for different latitudes in order to cause precession of the gyroscope at the required rate to keep up with the earth. This means may assume the form of a wheel 31 tapped to receive threads 30 on shaft 2. A manualy releasable spring clip 32 may be mounted on the casing 3 in a position to engage the notched periphery of the wheel 31 to hold the latter in adjusted position.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A steering device for ships, in combination, a magnetic compass having north-seeking properties but subject to error during changes in heading of the ship, a gyroscopic apparatus mounted adjacent said compass comprising a gyroscope mounted for three degrees of freedom, of small size and of little or no pendulosity and having therefore little or no north-seeking properties and being substantially unaffected by changes in heading of the ship, and means whereby said gyroscope may be reset at will.

2. An instrument for use on shipboard in conjunction with the compass, said instrument comprising an azimuth gyroscope having its plane of rotation normally fore and aft of the ship, means controlled by said gyroscope for indicating change in heading of the ship and means for centralizing said gyroscope at will.

3. An instrument for use on shipboard, said instrument comprising an azimuth gyroscope having its plane of rotation normally fore and aft of the ship, means controlled by said gyroscope for indicating change in heading of the ship and electromagnetically controlled means for centralizing said gyroscope.

4. A navigational instrument adapted to be employed in conjunction with a compass comprising a gyroscope having substantially three degrees of freedom, an indicator connected thereto for showing changes in the ship's heading, and means for slowly causing said gyroscope to assume a predetermined position with respect to the ship.

In testimony whereof I have affixed my signature.

HARRY L. TANNER.